United States Patent [19]

Segers

[11] 4,162,260

[45] Jul. 24, 1979

[54] OIL PURIFICATION BY ADDING HYDRATABLE PHOSPHATIDES

[75] Inventor: Jacobus C. Segers, Nieuwerkerk aan de Ijssel, Netherlands

[73] Assignee: Lever Brothers Company, New York, N.Y.

[21] Appl. No.: 830,720

[22] Filed: Sep. 6, 1977

[30] Foreign Application Priority Data

Sep. 10, 1976 [GB] United Kingdom .............. 37643/76

[51] Int. Cl.$^2$ .......................... C11B 3/04; C09F 5/10

[52] U.S. Cl. .............................. 260/424; 260/428.5

[58] Field of Search .............. 260/403, 420, 424, 425, 260/428, 428.5

[56] References Cited

U.S. PATENT DOCUMENTS

| | | | |
|---|---|---|---|
| 3,134,794 | 5/1964 | Myers | 260/403 |
| 4,049,686 | 9/1977 | Ringers et al. | 260/424 |

*Primary Examiner*—John Niebling

*Attorney, Agent, or Firm*—James J. Farrell; Melvin H. Kurtz; Kenneth F. Dusyn

[57] ABSTRACT

The invention relates to a process for removing impurities from triglyceride oils in which before the removal is effected the level of hydratable phosphatide is increased. The phosphatide together with the impurities can be removed from the oil by any suitable degumming process. Impurities which are removed by the process of the invention include iron, non-hydratable phosphatides, waxes, sterolglucosides, etc.

22 Claims, 2 Drawing Figures

OIL PURIFICATION BY ADDING HYDRATABLE PHOSPHATIDES

Figure 1:
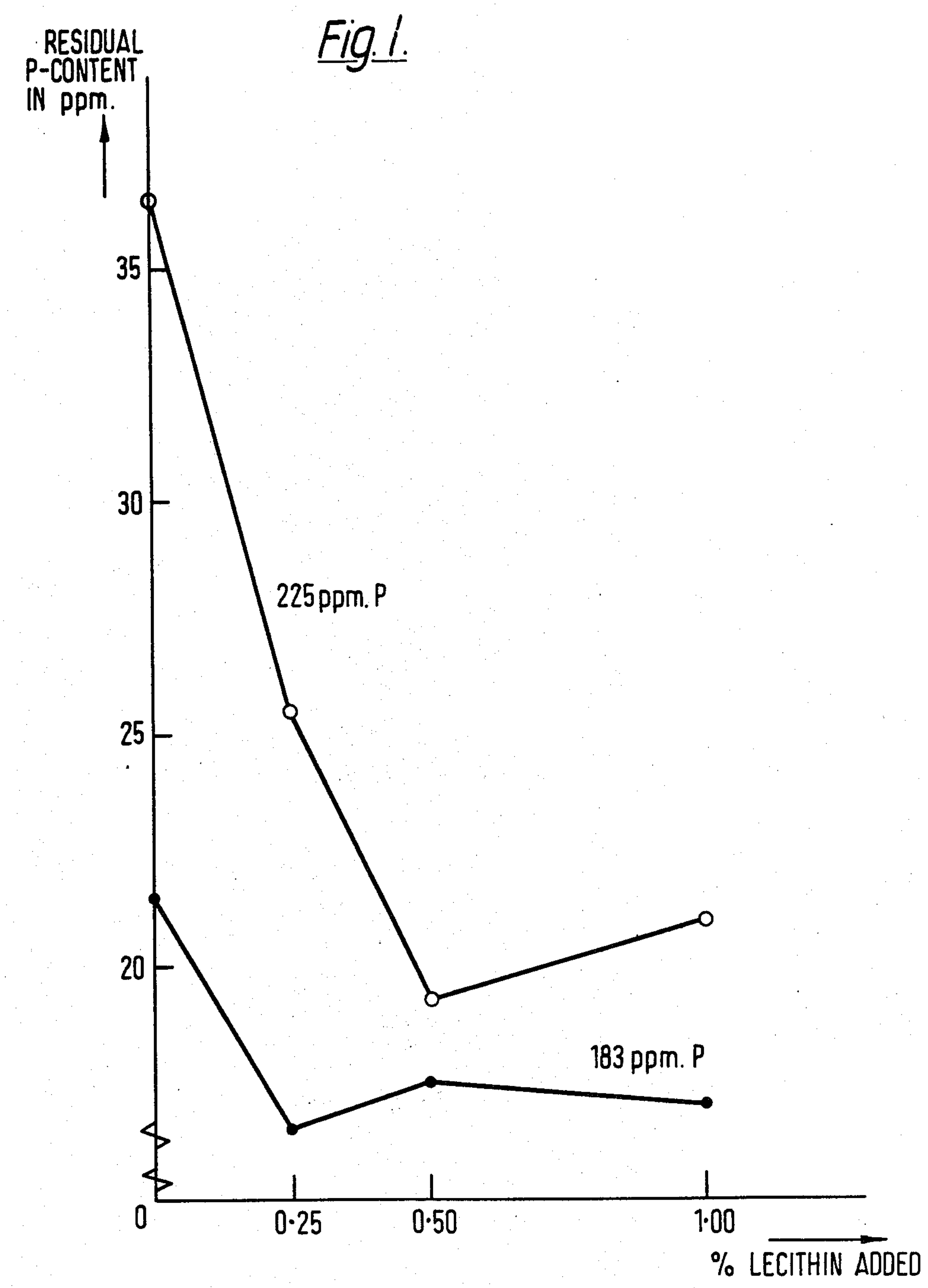

The invention relates to a process for removing impurities from triglyceride oils, usually indicated as refining of triglyceride oils.

Triglyceride oils are very valuable raw materials. Crude or incompletely refined oils contain triglycerides of fatty acids and furthermore minor components, for instance colouring materials, sugars, sterolglucosides, waxes, partial glycerides, proteins, free fatty acids, phosphatides, metals, etc. Depending on the proposed use of the oil, some or all of these minor components should at least partially be removed.

A particularly important group of the minor components is formed by the phosphatides. The phosphatides can be distinguished in two classes, viz the hydratable and the non-hydratable phosphatides. The main component of the hydratable phosphatides is phosphatidylcholine, whereas the non-hydratable phosphatides mainly consist of the calcium and magnesium salts of phosphatidic acid and of phosphatidyl ethanolamine.

The hydratable phosphatides can easily be removed from the oil by treatment of the oil with water or steam, usually at higher temperatures, by which treatment these phosphatides are hydrated and become insoluble in the oil and hence can be separated. The product so obtained is usually called lecithin.

The removal of the non-hydratable phosphatides has always been a great problem, requiring treatment with strong acids or alkali to convert them to a hydratable form. In the usual refining process for triglyceride oils the hydratable phosphatides are removed by a treatment as described above, after which the oil is treated with an alkali, usually at an elevated temperature, to neutralize the free fatty acids present in the oil and to convert the non-hydratable phosphatides to a hydratable form. Often phosphoric acid is added before the lye treatment to assist in the removal of the non-hydratable phosphatides. The so-called soapstock which is formed during the lye treatment, is separated from the neutralized oil. This process has many disadvantages, such as the use of excess alkali to neutralize the phosphoric acid which was previously added. Further calcium and magnesium ions, released from the non-hydratable phosphatides form insoluble phosphate compounds. The precipitated calcium and magnesium phosphates form a heavy sludge containing entrained oil, which sludge fouls the centrifugal bowls of the centrifuges used to separate the soapstock from the oil. Further the phosphatides, sugars, glycerol and other minor components removed get into the soapstock, which causes difficulties in the soap splitting process. During the soap splitting said impurities get into the acid water causing effluent problems.

To avoid the drawbacks of the above-described conventional refining process numerous proposals have been made to improve the degumming step in order to more completely remove the gums from the oil before the latter is subjected to the treatment with alkali.

According to U.S. Patent Specification No. 2,245,537 gummy materials other than phosphatides are first precipitated with a small amount of water, preferably containing a protein precipitating agent, whereafter the phosphatides are precipitated with the aid of a slightly acidic aqueous solution.

According to U.S. Patent Specification No. 2,351,184 gums are removed from glyceride oils by adding a slightly acidic aqueous solution to the oil, heating the oil to coagulate the gums, agglomerating the gums and separating them from the oil by centrifuging.

According to U.S. Patent Specification No. 2,576,958 crude glyceride oils are degummed by addition of a refining agent while the oil is diluted with 5 to 25% of a volatile organic solvent and at a temperature of about 0° to 15° C. The gums are centrifugally separated from the oil, whereafter the solvent is removed by evaporation. The refining agent can be an acid or an alkali.

U.S. Patent Specification No. 2,666,074 describes a refining process in which an aqueous solution of a polybasic aliphatic acid is added to the oil in such an amount that the water content of the oil is brought to 0.1 to 0.5% by weight and the amount of acid added on a dry basis is at least 0.01% by weight of the oil, whereafter the mixture is immediately subjected to an alkali refining operation.

U.S. Patent Specification No. 2,782,216 describes a degumming process for glyceride oils in which before, during or after the addition of the degumming water an acid anhydride is added. The whole process is carried out at a temperature above 40° C.

French Patent Specification No. 1,385,670 describes a degumming process in which before the addition of the degumming water hydrochloric acid is added to the oil. According to this patent specification the whole process should be carried out at a temperature below 40° C.

In French Patent Specification No. 1,388,671 a degumming process for partially degummed oils is described, in which the oil is admixed with nitric acid and thereafter washed with water.

In British Patent Specification No. 1,053,807 a method of refining fats and oils is described, in which the fat or oil to be refined is intimately mixed with an intimate mixture comprising an emulsifying agent and an aqueous solution of an acid or acid salt and then removing the impurities. Preferably the impurities are removed by adding an adsorbent or a bleaching earth and removing the adsorbent or bleaching earth together with the impurities by filtration.

The present invention provides an improved process for removing umpurities from triglyceride oils, in which before the removal is effected the level of hydratable phosphatide of said oil is increased.

The invention is based upon the observation that oils containing either no or a low amount of hydratable phosphatides can be better refined when a hydratable phosphatide is added to the oil and this phosphatide together with impurities is removed from the oil by any degumming process.

As the "hydratable phosphatides" preferably the phosphatides are used, which are obtained by treating vegetable oils containing them, like soyabean oil, peanut oil, sunflower seed oil and rapeseed oil, cottonseed oil, etc., with steam or water and separating the hydrated phosphatides or lecithin. Of course also hydratable lecithins derived from other sources, like egg yolk, or synthetically prepared, hydratable phosphatides, can be used in the process of the present invention. Before the phosphatides are added to the oil to be refined they are preferably dried under reduced pressure. Further partially hydrolysed lecithins, hydroxylated lecithins and/or acylated lecithins can be used in the process of the invention. Also phosphatide fractions obtained by fractionation of such phosphatides with a solvent or solvent mixtures, can be used.

The amount of hydratable phosphatides added is usually between about 0.01 and about 5% by weight, calculated on the oil, preferably about 0.1 to about 2% by weight.

The hydratable phosphatide can be removed again from the oil by any degumming process known in the art, depending on the type of oil being treated and on the kind of impurities contained therein.

Such processes include degumming with water or steam and centrifuging in the manner described above. The degumming may be assisted by adding an electrolyte, such as diluted or concentrated acids, acid anhydrides or alkalis, salts and/or surfactants, to the oil. Suitable degumming processes are described in for instance U.S. Patent Specifications Nos. 2,245,537; 2,351,184; 2,576,958; 2,666,074 and 2,782,216; French Patent Specifications Nos. 1,385,670, 1,388,671; British Patent Specifications No. 1,053,807 and No. 1,039,439. A particularly advantageous process for removing the phosphatides is described in Applicants' copending British Patent Application No. 9862/75, according to which the phosphatides are removed from the oil by mixing the oil with a concentrated acid or acid anhydride having a pH of at least 0.5 as measured at 20° C. in a one molar solution, subsequently dispersing 0.2 to 5% by weight of water in the mixture obtained and finally separating an aqueous sludge containing the gums from the oil, the mixture of oil, water and acid or anhydride being maintained for at least 5 minutes at a temperature below 40° C. before separating the aqueous sludge. By this process also the non-hydratable phosphatides are removed from the oil. Hence this method is preferred when oils containing non-hydratable phosphatides are being treated by the process of the invention.

The latter process is preferably effected by adding the acid or anhydride to the oil of a temperature of at least 60° C., particularly 65°-90° C. Particularly an aqueous solution of an edible acid is used containing at least 25% of acid. Suitably an amount of 0.001 to 0.5% of citric acid (calculated as dry acid) is added to the oil. Preferably before separating the aqueous sludge, the oil, water and acid mixture is adjusted to 20° to 35° C.

Further the phosphatides can be removed by ultrafiltration, which process is described in our copending British Patent Application No. 21,813/74. Also by this method non-hydratable phosphatides are removed together with the hydratable phosphatides.

All the above-mentioned patent specifications are incorporated herein by way of reference.

The process of the invention offers a number of advantages. By carrying out this process before the usual alkali refining step, impurities such as sugar, sterol glucosides, glycerol, proteins, waxes, etc. are removed from the oil and can be used, for instance in the preparation of animal feedstuffs. In the prior art processes said substances are removed in the alkali-refining step with the soapstock, often causing difficulties in the soapstock splitting process, like the formation of emulsions, which are difficult to separate, leading to high acid oil losses. In the soapstock splitting process said substances go partly over into the acid water, which means that they must be disposed of with the effluent.

When applying the process of the invention the alkali refining step can often be deleted completely and the fatty acids be removed by distillation.

Further heavy metals like iron, can be removed by the process of the invention, which is very important because said heavy metals have a deleterious influence on the stability of the oil. In the conventional process these heavy metals are removed by treatment with strong acids and bleaching earth, which process leads to substantial oil losses and disposal problems for the spent earth.

A further advantage of the process of the invention is that the separation of non-hydratable phosphatides is improved by the prior addition of hydratable phosphatides. This advantage is of particular importance in processes like those described in U.S. Patent Specification No. 2,782,216 and in co-pending British Patent Application No. 9862/75, when oils containing no or low amounts of hydratable phosphatides and appreciable amounts of non-hydratable phosphatides, like rapeseed oil and sunflower seed oil, etc., have to be refined. Moreover, it has been found that in such processes lower amounts of acid or anhydride can be used than are needed without the prior addition of hydratable phosphatides. This not only means a saving in acid or anhydride consumption, but also leads to an improvement of the quality of the phosphatides.

In general it is preferred to remove the added hydratable phosphatides by a simple water-degumming process as described above, when oils containing no or only a very low amount of non-hydratable phosphatides, like palm oil, palmkernel oil, coconut oil, etc. are to be refined.

For oil, containing non-hydratable phosphatides, like soyabean oil, linseed oil, rapeseed oil, etc. the process according to the co-pending British Patent Application No. 9862/75 is preferred.

The invention is further illustrated by the following Examples, but not restricted thereto. (In the Examples all percentages are by weight).

EXAMPLE I

To two soyabean oils, from which the hydratable phosphatides had been removed by precipitation with steam at 90° C. and by separating the phosphatides so precipitated, which oils essentially contained non-hydratable phosphatides mainly in the form of phosphatidic acid (PA), were added different amounts of hydratable dried phosphatides or lecithin, obtained by the above described treatment with steam. Also comparative trials were carried out in which no hydratable lecithin was added. These two oils, one containing 255 ppm phosphorus and the other 183 ppm phosphorus in the form of the non-hydratable phosphatides were treated. The oils were heated to 70° C., a citric acid solution in water (1:1) was added to the oil and after mixing the acid with the oil the mixture was cooled to 30° C. Then 1.5% of water was mixed with the oil and the oil allowed to stand for 60 minutes under mild stirring. Next the phosphatides were removed by centrifugal separation.

To investigate the influence of the addition of lecithin and the amount of citric acid on the removal of the phosphatides a series of experiments were carried out according to a scheme as shown in Table 1.

Table 1

| Expt. no. | Batch no. | citric acid solution (1:1) (%) | amount of lecithin added (%) |
|---|---|---|---|
| 1 | | 0.30 | 0.25 |

Table 1-continued

| Expt. no. | Batch no. | citric acid solution (1:1) (%) | amount of lecithin added (%) |
|---|---|---|---|
| 2 | batch 1 183 ppm P | 0.22 | 0.25 |
| 3 | | 0.22 | 0.00 |
| 4 | | 0.08 | 0.00 |
| 5 | | 0.30 | 1.0 |
| 6 | | 0.30 | 0.00 |
| 7 | | 0.08 | 0.5 |
| 8 | | 0.08 | 0.25 |
| 9 | | 0.15 | 0.5 |
| 10 | | 0.15 | 1.0 |
| 11 | | 0.22 | 0.5 |
| 12 | | 0.30 | 0.5 |
| 13 | | 0.22 | 1.0 |
| 14 | | 0.15 | 0.00 |
| 15 | | 0.08 | 1.0 |
| 16 | | 0.15 | 0.25 |
| 17 | | 0.08 | 0.5 |
| 18 | batch 2 255 ppm P | 0.22 | 0.25 |
| 19 | | 0.08 | 0.25 |
| 20 | | 0.15 | 0.25 |
| 21 | | 0.15 | 0.00 |
| 22 | | 0.30 | 0.5 |
| 23 | | 0.22 | 0.5 |
| 24 | | 0.08 | 1.0 |
| 25 | | 0.30 | 1.0 |
| 26 | | 0.22 | 0.0 |
| 27 | | 0.30 | 0.0 |
| 28 | | 0.30 | 0.25 |
| 29 | | 0.15 | 1.0 |
| 30 | | 0.15 | 0.5 |
| 31 | | 0.08 | 0.0 |
| 32 | | 0.22 | 1.0 |

Figure 2:
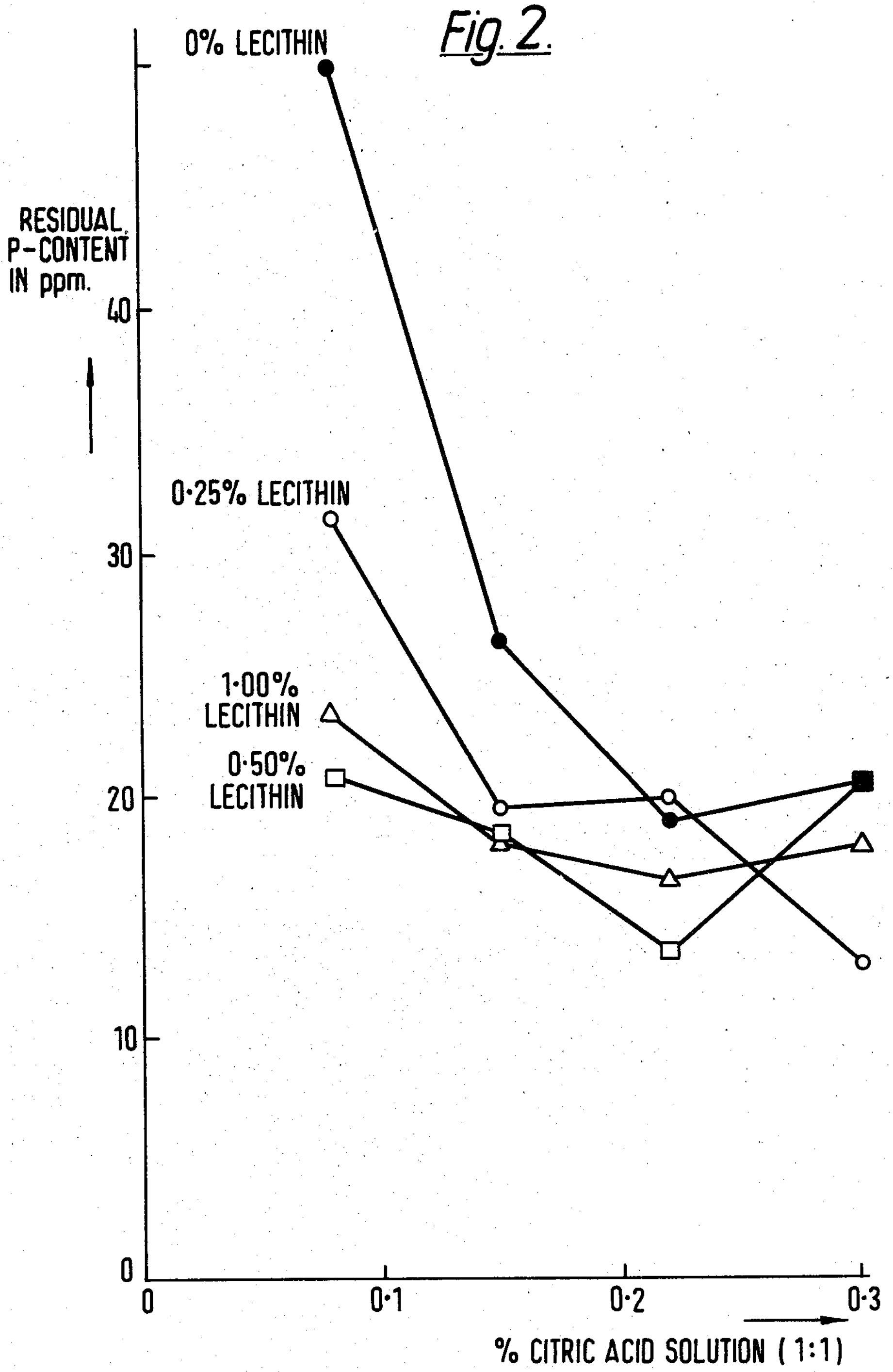

The results were statistically evaluated and are presented in graphical form in FIGS. 1 and 2. In FIG. 1 the mean residual P-contents of four trials with different amounts of citric acid are given as a function of the amount of lecithin added for both oils. From the Figure it can be seen that for the oil with 183 ppm phosphorus, the mean P-content can be reduced to 21 ppm when no lecithin is added, while the addition of only 0.25% lecithin allows a reduction of the mean P-content to about 16 ppm. For the oil containing 255 ppm the mean P-content is reduced to about 36 ppm without lecithin addition and to 19 ppm when 0.5% lecithin is added.

In FIG. 2 the mean residual P-contents of two trials with the two oils are given as a function of the amount of citric acid solution, using the amount of lecithin added as a parameter for the different curves. The figure clearly shows that the addition of hydratable phosphatides in the form of lecithin enables a sharp reduction in the amount of acid added, whereby still the same degumming effect is obtained.

EXAMPLE II

To the liquid fraction of a palm oil, obtained by solvent fractionation of crude palm oil and containing 4 ppm P and 10 ppm iron, was added 0.3% of hydratable phosphatides. The phosphatides were removed again in the manner described in Example I. After the treatment the P-content was raised to 9 ppm and the iron content was decreased to 1.9 ppm, showing that the process of the invention enables a sharp reduction of iron content of the oil.

EXAMPLE III

Example II was repeated with crude coconut oil, containing 6.3 ppm iron. After the treatment the iron content was reduced to 1.2 ppm.

EXAMPLES IV AND V

To 500 g of crude rapeseed oil were added 0.3% and 0.9% respectively of hydratable phosphatides in the form of soyabean lecithin. Then the oil was heated to 70° C., admixed with 0.3% of a 1:1 citric acid solution and stirred for 15 minutes. Thereafter the mixture was cooled to 30° C., 5% of water was added, and after 1 hour stirring an aqueous sludge was separated by centrifuging. The resultant oils were analysed for P-, Ca- and Mg-content. Also a comparative trial was carried out, using the same procedure but without addition of lecithin. The results are summarized in Table 2.

Table 2

| | Lecithin added (%) | P-content (ppm) | Ca-content (ppm) | Mg-content (ppm) |
|---|---|---|---|---|
| Starting oil | — | 131 | 113 | 21 |
| Comparative example | — | 26 | 14 | 3 |
| Example IV | 0.3 | 17 | 4 | 1 |
| Example V | 0.9 | 8 | 0.9 | 0.3 |

The Figures in the Table make it clear that the prior addition of lecithin has a beneficial effect both on the removal of the phosphatides and on the removal of calcium and magnesium.

EXAMPLES VI AND VII

The process described in Example IV was repeated with crude linseed oil. The results are summarized in Table 3.

Table 3

| | Lecithin added (%) | P-content* (ppm) |
|---|---|---|
| Starting oil | — | 160 |
| Comparative example | — | 27* |
| Example VI | 0.3 | 10* |
| Example VII | 0.9 | 9* |

*mean of two runs.

EXAMPLE VIII

Soyabean oil from which most of the hydratable phosphatides had been removed by addition of water and centrifuging, and having a residual phosphorus content of 78 ppm, was admixed with 0.3% of the alcohol-soluble fraction of commerical soyabean lecithin, prepared as described in German Patent Specification No. 1,492,952, while the oil had a temperature of 70° C. Thereafter 0.1% of a 1:1 citric acid solution was added, the mixture was cooled to 30° C., then 2.5% of water was added and after 2 hours' mild stirring the mixture was centrifuged. After this treatment no phosphorus could be detected in the oil.

When the same procedure was followed without the addition of the lecithin fraction the oil obtained still contained 21 ppm phosphorus.

EXAMPLE IX

Soyabean oil from which most of the hydratable phosphatides had been removed by addition of water and centrifuging, and having a residual phosphorus content of 100 ppm, was admixed with 0.3% of enzymatically hydrolysed lecithin, prepared as described in U.S. Patent Specification No. 3,652,397, while the oil had a temperature of 70° C. Thereafter, 0.1% of an 1:1 citric acid solution was added, the mixture was cooled to 30° C., then 2.5% of water was added and after 2 hours' mild stirring the mixture was centrifuged. In the resulting oil no phosphorus could be detected.

When the same procedure was followed, but without the lecithin addition, the oil obtained still contained 22 ppm phosphorus.

EXAMPLE X

Soyabean oil from which most of the hydratable phosphatides had been removed by degumming with water, and having a residual phosphorus content of 112 ppm, was admixed with 0.3% of a lecithin obtained by degumming with acetic anhydride, as described in U.S. Patent Specification No. 2,782,216, while the oil had a temperature of 70° C. Thereafter, 0.1% of a 50% citric acid solution was added, the mixture was cooled to 30° C., then 2.5% of water was added and after 2 hours' mild stirring the mixture was centrifuged.

The resulting oil had a phosphorus content of 6.9 ppm.

When this procedure was repeated, but without the lecithin addition, the oil obtained contained 31 ppm phosphorus. When 0.3% of the citric acid solution was used instead of 0.1%, the phosphorus content of the resulting oil was only 0.4 ppm.

EXAMPLE XI

To three portions of crude rapeseed oil, having a phosphorus content of 133 ppm, were added 0.3, 0.6 and 1.2% respectively of a commercial soyabean lecithin, while the oil had a temperature of 70° C. Thereafter 0.1% of a 50% solution of citric acid was added, the mixture was cooled to 30° C. and then 2.5% of water was added. After 1 hour's mild stirring the mixture was centrifuged. The resulting oils had a phosphorus content of 17, 11 and 4.8 ppm respectively.

When the procedure was repeated, but without the lecithin addition, an oil with a phosphorus content of 79 ppm was obtained.

EXAMPLE XII

Crude sunflower seed oil having a phosphorus content of 65 ppm and a wax content of 1445 ppm was admixed at 70° C. with 0.3% of commercial lecithin. Thereafter, 0.3% of a 50% citric acid solution was added. The mixture was cooled to 20° C., 2.5% of water was added and after 1 hour's mild stirring the mixture was centrifuged. In the refined oil so obtained phosphorus was no longer detectable and its wax content was 87 ppm.

When the procedure was repeated, but without the lecithin addition, an oil with a phosphorus content of 11 ppm and a wax content of 491 ppm was obtained.

EXAMPLE XIII

The procedure of Example XII was repeated, using a sunflower seed oil containing 1276 ppm wax and 72 ppm phosphorus. Further 0.15% of the 50% citric acid solution was used and the mixture was cooled to 10° C.

The oil obtained had a phosphorus content of 1.0 and a wax content of only 10 ppm.

EXAMPLE XIV

Crude palmoil with an iron content of 14 ppm was at 70° C. admixed with 1.0% of commercial soyabean lecithin with low iron content. After 15 minutes' stirring 2.5% of water was added and after a further 15 minutes' stirring the mixture was centrifuged still at 70° C. The iron content of the oil obtained was 7.2 ppm.

EXAMPLE XV

Crude palmoil with an iron content of 14 ppm was at 70° C. admixed with 0.1% of commercial soyabean lecithin with low iron content. After 15 minutes' stirring 0.1% of a 50% citric acid solution was added and the mixture was stirred for a further 15 minutes. Then 2.5% of water was added and after a further 15 minutes' stirring the mixture was centrifuged still at 70° C.

The oil obtained had an iron content of 3.2 ppm.

EXAMPLE XVI

Crude palmoil containing 7 ppm iron was at 70° C. admixed with 0.3% of commercial lecithin. After cooling to 40° C., 2.5% of water was added. After 2 hours' mild stirring the mixture was centrifuged. The resulting oil had an iron content of 2.7 ppm.

When instead of 0.3%, 1% of lecithin was used, the resulting oil had an iron content of 1.8 ppm.

EXAMPLE XVII

Crude palmoil containing 7 ppm iron was at 70° C. admixed with 1.2% of commercial lecithin. Then 0.1% of a 50% solution of citric acid was added. After cooling to 40° C., 2.5% of water was added and after 2 hours' mild stirring the mixture was centrifuged.

The resulting oil had an iron content of only 0.45 ppm.

EXAMPLE XVIII

Water-degummed soyabean oil with a phosphorus content of 97 ppm was at 70° C. admixed with 3.0% of commercial lecithin. After 15 minutes' stirring 0.15% of acetic anhydride was added. After a further 15 minutes' stirring 1.5% of water was added. After a further 15 minutes' stirring the mixture was centrifuged still at 70° C.

The phosphorus content of the resulting oil was 5.8 ppm.

Without the lecithin addition the same procedure yielded an oil with a phosphorus content of 73 ppm.

EXAMPLE XIX

Example XVIII was repeated with the exception that 1.0% of lecithin was used, that the mixture was cooled to 20° C. after addition of the acetic anhydride and that after addition of the water the mixture was stirred for 1 hour at 20° C., whereafter the mixture was centrifuged at 20° C. The phosphorus content of the resulting oil was 2.5 ppm.

EXAMPLE XX

Sunflower oil with a phosphorus content of 72 ppm and a wax content of 1276 ppm was at 70° C. admixed with 0.3% of commercial soyabean lecithin. After cooling at 20° C. 2.5% of water was added. The mixture was mildly stirred for 1 hour at 20° C. and then centrifuged. The resulting oil had a phosphorus content of 56 ppm and a wax content of 18 ppm.

EXAMPLE XXI 1.5 kg of crude sunflowerseed oil with a phosphorus content of 58 ppm and a wax content of 1805 ppm was mixed with 0.3% of commercial lecithin. Then 0.1% citric acid, dissolved in 0.1% water, was added, followed by ten minutes' stirring. Then 1.5% water was added, followed by one hour's stirring and centrifuging. During the whole experiment the temperature was maintained at 20° C. The oil contained after centrifuging 4 ppm phosphorus and 48 ppm wax.

EXAMPLE XXII

Example XXI was repeated with the same oil except that the temperature was now maintained at 15° C. The dewaxed sunflowerseed oil contained 6 ppm phosphorus and 41 ppm wax.

I claim:

1. A process for removing impurities from triglyceride oils comprising admixing a hydratable phosphatide with said oils and separating from said oil said phosphatide together with impurities of the oil by any conventional degumming process.

2. Process according to claim 1, in which 0.01 to 5% by weight of phosphatide is added to the oil.

3. Process according to claim 2, in which 0.1 to 2% by weight of phosphatide is added.

4. Process according to claim 1, in which as hydratable phosphatide, a phosphatide obtained by the water degumming of a vegetable oil is used.

5. Process according to claim 4, in which as hydratable phosphatide, a phosphatide obtained by water degumming of soyabean oil, peanut oil, sunflower seed oil, rapeseed oil or cottonseed oil is used.

6. Process according to claim 5, in which as hydratable phosphatide commercial soyabean lecithin is used.

7. Process according to claim 1, in which a modified hydratable phosphatide is added.

8. Process according to claim 1, in which a partially hydrolysed phosphatide is used.

9. Process according to claim 7, in which a hydroxylated phossphatide is used.

10. Process according to claim 7, in which an acylated phosphatide is used.

11. Process according to claim 7, in which a hydratable lecithin fraction is used.

12. Process according to claim 1, in which the removal of impurities is effected by the addition of water and by centrifuging.

13. Process according to claim 12, in which an electrolyte is added.

14. Process according to claim 1, in which after the addition of the phosphatide and before the degumming with water an acid or anhydride is added.

15. Process according to claim 14, in which an edible organic acid is used.

16. Process according to claim 15, in which citric acid is used.

17. Process according to claim 1, in which the removal of added phosphatide together with impurities is effected by dispersing an effective amount of a substantially concentrated acid or acid anhydride having a pH of at least 0.5 as measured at 20° C. in a one molar aqueous solution, in the oil, subsequently dispersing 0.2 to 5% by weight of water in the mixture obtained, and finally separating an aqueous sludge containing the gums from the oil, the mixture of oil, water and acid being maintained for at least 5 minutes at a temperature below 40° C. before separating the aqueous sludge.

18. Process according to claim 17, in which the acid or anhydride is added to the oil of a temperature of at least 60° C.

19. Process according to claim 18, in which the acid or anhydride is added to the oil of a temperature from 65° to 90° C.

20. Process according to claim 1, in which an aqueous solution of an edible acid containing at least 25% of acid is used.

21. Process according to claim 20, in which from 0.001 to 0.5% by weight of citric acid, calculated as dry acid, is added to the oil.

22. Process according to claim 1, in which before separating the aqueous sludge, the oil, water and acid mixture is adjusted to 20° C. to 35° C.

* * * * *